United States Patent
Chang et al.

(10) Patent No.: US 7,732,364 B2
(45) Date of Patent: Jun. 8, 2010

(54) PROCESS FOR IONIC LIQUID CATALYST REGENERATION

(75) Inventors: Bong-Kyu Chang, San Rafael, CA (US);
Huping Luo, Richmond, CA (US);
Moinuddin Ahmed, Hercules, CA (US);
Krishniah Parimi, Alamo, CA (US);
Saleh Elomari, Fairfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 12/003,578

(22) Filed: Dec. 28, 2007

(65) Prior Publication Data
US 2009/0170688 A1 Jul. 2, 2009

(51) Int. Cl.
*B01J 38/10* (2006.01)
(52) U.S. Cl. .............. 502/53; 502/29; 502/32; 502/155; 502/167; 502/150
(58) Field of Classification Search ............ None
See application file for complete search history.

(56) References Cited

U.S. PATENT DOCUMENTS

| | | | |
|---|---|---|---|
| 4,122,245 A | 10/1978 | Nardi et al. | |
| 4,463,071 A | 7/1984 | Gifford et al. | |
| 4,463,072 A | 7/1984 | Gifford et al. | |
| 5,104,840 A | 4/1992 | Chauvin et al. | |
| 5,304,522 A * | 4/1994 | Jalkian et al. | 502/22 |
| 5,731,101 A | 3/1998 | Sherif et al. | |
| 6,004,519 A | 12/1999 | Doane et al. | |
| 6,096,680 A | 8/2000 | Park | |
| 6,797,853 B2 | 9/2004 | Houzvicka et al. | |
| 2003/0060359 A1 | 3/2003 | Olivier-Bourbigou et al. | |
| 2004/0077914 A1 | 4/2004 | Zavilla et al. | |
| 2004/0133056 A1 | 7/2004 | Liu et al. | |
| 2006/0131209 A1 * | 6/2006 | Timken et al. | 208/16 |
| 2007/0142211 A1 | 6/2007 | Elomari et al. | |
| 2007/0142213 A1 | 6/2007 | Elomari et al. | |
| 2007/0142215 A1 | 6/2007 | Harris et al. | |
| 2007/0142217 A1 | 6/2007 | Elomari et al. | |
| 2007/0249485 A1 | 10/2007 | Elomari et al. | |
| 2007/0249486 A1 * | 10/2007 | Elomari et al. | 502/53 |

OTHER PUBLICATIONS

Christopher J. Adams et al ("Friedel-Crafts reactions in room temperature ionic liquids", Chem Commun 1998, pp. 2097-2098).*
Miron, et al., "Molecular Structure of Conjunct Polymers", Journal of Chemical and Engineering Data, pp. 150-160 (1963).
Pines, Herman, "Saga of a discovery: Alkylation", Chem Tech, pp. 150-154, (1982).
U.S. Appl. No. 12/003,577 "System and Apparatus for Ionic Liquid Catalyst Regeneration", Luo, et al., filed Dec. 28, 2007.

* cited by examiner

*Primary Examiner*—Melvin C Mayes
*Assistant Examiner*—Smita Patel
(74) *Attorney, Agent, or Firm*—Merchant & Gould PC

(57) ABSTRACT

A regeneration process for re-activating an ionic liquid catalyst, which is useful in a variety of reactions, especially alkylation reactions, and which has been deactivated by conjunct polymers. The process includes a reaction step and a solvent extraction step. The process comprises (a) providing the ionic liquid catalyst, wherein at least a portion of the ionic liquid catalyst is bound to conjunct polymers; and (b) reacting the ionic liquid catalyst with aluminum metal to free the conjunct polymers from the ionic liquid catalyst in a stirred reactor or a fixed reactor. The conjunct polymer is then separated from the catalyst phase by solvent extraction in a stirred extraction or packed column.

20 Claims, 1 Drawing Sheet

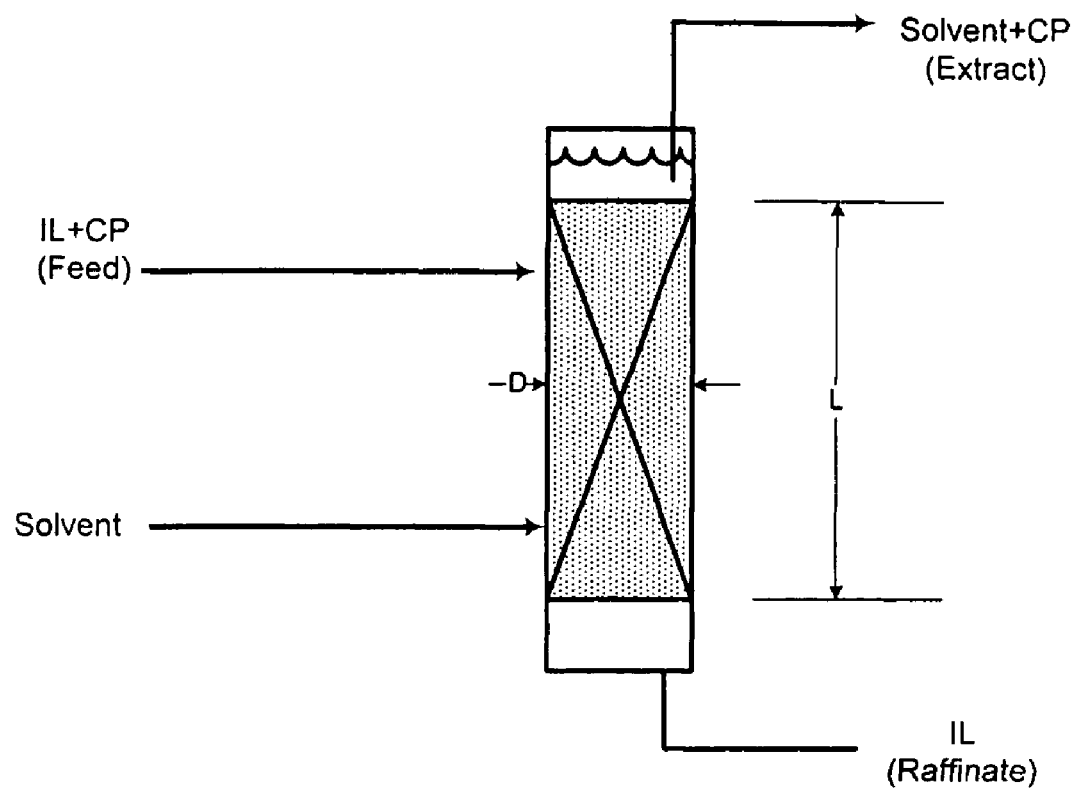
Figure

PROCESS FOR IONIC LIQUID CATALYST REGENERATION

FIELD OF ART

The present disclosure relates to regenerating ionic liquid catalysts. More particularly, the present disclosure relates to regenerating chloroaluminate ionic liquid catalysts by reaction in a stirred or bed reactor, followed by extraction in a stirred or packed column.

BACKGROUND

Ionic liquids are liquids that are composed entirely of ions. The so-called "low temperature" ionic liquids are generally organic salts with melting points under 100 degrees C., or often even lower than room temperature. Ionic liquids may be suitable, for example, for use as a catalyst and as a solvent in alkylation.

One class of ionic liquids is fused salt compositions, which are molten at low temperature and are useful as catalysts, solvents, and electrolytes. Such compositions are mixtures of components which are liquid at temperatures below the individual melting points of the components.

Ionic liquids can be defined as liquids whose make-up is entirely comprised of ions as a combination of cations and anions. The most common ionic liquids are those prepared from organic-based cations and inorganic or organic anions. The most common organic cations are ammonium cations, but phosphonium and sulphonium cations are also frequently used. Ionic liquids of pyridinium and imidazolium are perhaps the most commonly used cations. Anions include, but are not limited to, $BF_4{-}$, $PF_6{-}$, haloaluminates such as $Al_2Cl_7{-}$ and $Al_2Br_7{-}$, $[(CF_3SO_2)_2N]{-}$, alkyl sulphates ($RSO_3{-}$), carboxylates ($RCO_2{-}$) and many others. The most catalytically interesting ionic liquids are those derived from ammonium halides and Lewis acids (such as $AlCl_3$, $TiCl_4$, $SnCl_4$, $FeCl_3$ ... etc.). Chloroaluminate ionic liquids are perhaps the most commonly used ionic liquid catalyst systems.

Examples of such low temperature ionic liquids or molten fused salts are the choloraluminate salts. Alkyl imidazolium or pyridinium salts, for example, can be mixed with aluminum trichloride ($AlCl_3$) to form the fused chloroaluminate salts. The use of the fused salts of 1-alkylpyridinium chloride and aluminum trichloride as electrolytes is discussed in U.S. Pat. No. 4,122,245. Other patents which discuss the use of fused salts from aluminum trichloride and alkylimidazolium halides as electrolytes are U.S. Pat. Nos. 4,463,071 and 4,463,072.

U.S. Pat. No. 5,104,840 describes ionic liquids which comprise at least one alkylaluminum dihalide and at least one quaternary ammonium halide and/or at least one quaternary ammonium phosphonium halide; and their uses as solvents in catalytic reactions.

U.S. Pat. No. 6,096,680 describes liquid clathrate compositions useful as reusable aluminum catalysts in Friedel-Crafts reactions. In one embodiment, the liquid clathrate composition is formed from constituents comprising (i) at least one aluminum trihalide, (ii) at least one salt selected from alkali metal halide, alkaline earth metal halide, alkali metal pseudohalide, quaternary ammonium salt, quaternary phosphonium salt, or ternary sulfonium salt, or a mixture of any two or more of the foregoing, and (iii) at least one aromatic hydrocarbon compound.

Aluminum-containing catalysts are among the most common Lewis acid catalysts employed in Friedel-Crafts reactions. Friedel-Crafts reactions are reactions which fall within the broader category of electrophylic substitution reactions including alkylations.

Other examples of ionic liquids and their methods of preparation may also be found in U.S. Pat. Nos. 5,731,101; 6,797,853 and in U.S. Patent Application Publications 2004/0077914 and 2004/0133056.

As a result of use, ionic liquid catalysts become deactivated, i.e. lose activity, and may eventually need to be replaced. Alkylation processes utilizing an ionic liquid catalyst form by-products known as conjunct polymers. These conjunct polymers deactivate the ionic liquid catalyst by forming complexes with the ionic liquid catalyst. Conjunct polymers are highly unsaturated molecules and may complex the Lewis acid portion of the ionic liquid catalyst via their double bonds network system. As the aluminum trichloride becomes complexed with conjunct polymers the activity of the ionic liquid catalysts becomes impaired or at least compromised. Conjunct polymers may also become chlorinated and through their chloro groups may interact with aluminum trichloride and therefore reduce the overall activity of the catalyst or lessen its effectiveness as a catalyst for the intended purpose such as alkylation. Deactivation of the ionic liquid catalyst by conjunct polymers is not only problematic for the alkylation chemistry, but also weighs in heavily on the economics of using ionic liquids because they are expensive catalytic systems and their frequent replacement will be costly. Therefore, commercial exploitation of ionic liquid catalysts during alkylation is impossible unless they are efficiently regenerated and recycled.

Only a few methods for removing conjunct polymers from acidic ionic liquid catalysts in order to regenerate the catalysts have been devised. These methods are described in U.S. Patent Application Publication 2007/0142213 and include hydrogenation, addition of a basic reagent, and alkylation.

The first method, hydrogenation, saturates the double bonds of the conjunct polymers such that they release the acidic ionic liquid catalysts. For hydrogenation to occur, hydrogen must either be fed to the acidic ionic liquid catalyst/conjunct polymer complexes or hydrogen must be produced in situ. This may be done by treating the catalyst containing the conjunct polymers with a metal in the presence of a Bronsted acid where interaction between the metal and the acid produces the needed hydrogen. For example, reacting aluminum metal with hydrochloric acid will produce hydrogen and aluminum trichloride. Treating the spent catalyst containing conjunct polymers with Al metal in the presence of enough HCl will produce the hydrogen needed to saturate the double bonds of the conjunct polymers. After hydrogenation, the hydrogenated conjunct polymers are removed by solvent extraction or decantation and the regenerated ionic liquid catalyst is recovered.

The second method, addition of a basic agent (e.g. amines or ammonium chloride), similarly breaks up the acidic ionic liquid catalyst/conjunct polymer complexes as the basic agent forms new complexes with the catalyst. The basic agent must be carefully chosen so that it is part of the catalyst system undergoing regeneration. Otherwise, the basic agent will simply deactivate the catalyst in the same manner as the conjunct polymers. Additionally, the basic agent will react not only with the acidic ionic liquid catalyst/conjunct polymer complexes (e.g. $AlCl_3$/conjunct polymer complexes) but also with any unbound cation (e.g. $AlCl_3$). Therefore, the basic agent must correspond to the basic parent species of cation from which the ionic liquid to be regenerated was originally produced and the basic agent must be added in an amount sufficient to react with both cations bound in the acidic ionic liquid/conjunct polymer complexes and unbound cations. Then the free conjunct polymers are removed and the remaining new complexes are contacted with additional unbound cations (e.g. $AlCl_3$) to fully regenerate the catalyst. As an example, a used chloroaluminate ionic liquid may be contacted with butylpyridinium chloride to provide butylpyridinium tetrachloroaluminate and free the conjunct polymers and then the butylpyridinium tetrachloroaluminate may be contacted with $AlCl_3$ to fully restore the catalyst's activity.

However, while effective, each of these methods suffers from certain shortcomings. Thus, to take advantage of the potential of ionic liquids as catalysts, particularly in alkylation reactions, the industry continues to search for an effective and efficient ionic liquid catalyst regeneration process.

SUMMARY

Provided is a process for regenerating an ionic liquid catalyst which has been deactivated by conjunct polymers. The process comprises the steps of (a) providing an ionic liquid catalyst, wherein at least a portion of the ionic liquid catalyst is bound to conjunct polymers; (b) reacting the ionic liquid catalyst with aluminum metal to free the conjunct polymers from the ionic liquid catalyst in a stirred reactor or a fixed bed reactor; and (c) separating the freed conjunct polymers from the catalyst phase, such that the freed conjunct polymers cannot re-enter the catalyst phase and interact with the ionic liquid catalyst and perhaps deactivate it or accelerate its deactivation, by solvent extraction in a stirred extraction column or a packed column.

Among other factors, the present process is based on the discovery that dissociation of the conjunct polymers from the ionic liquid catalyst can be easily achieved in a stirred reactor or a fixed bed reactor, which allows the conjunct polymers to be thereafter successfully removed from the resulting conjunct polymer-ionic liquid catalyst mixture by solvent extraction in a stirred extraction or packed column. Previous attempts to remove conjunct polymers from the catalyst phase by only simple extraction methods without reaction with aluminum metal first, with hydrocarbon solvents such as hexane, decane and toluene were unsuccessful. It has since been realized that accumulation of conjunct polymers in the catalyst phase is most likely due to them being bound by strong interactions rather than them being simply soluble in the catalyst phase. Thus, extraction is fruitless unless the conjunct polymers are first freed (i.e. de-bonded) from the catalyst phase. The current process provides an effective and efficient means of regenerating ionic liquid catalysts because the reaction step efficiently de-bonds the conjunct polymers from the ionic liquid catalyst, and allows for effective extraction of the conjunct polymers using hydrocarbon solvents by means of a stirred extraction column or a packed column.

BRIEF DESCRIPTION OF THE DRAWING

The FIGURE depicts a counter-current extraction using a packed column for separation of conjunct polymers from the regenerated ionic liquid catalyst phase.

DETAILED DESCRIPTION

The present process is for the regeneration of spent or deactivated ionic liquid catalysts, including acidic ionic liquid catalysts. A catalyst that is spent or deactivated means a catalyst which has lost all or some of its catalytic activity. More particularly, the regeneration process regenerates or reactivates ionic liquid catalysts deactivated by conjunct polymers.

The term "conjunct polymer" as used herein refers to a polymeric compound that might complex to a cationic species of the ionic liquid catalyst by pi bonding or sigma bonding or other means, which results in the polymeric compound binding to the catalyst, so that it is not removable by simple hydrocarbon extraction.

The term conjunct polymer was first used by Pines and Ipatieff to distinguish these polymeric molecules from the usual polymers. Unlike typical polymers, conjunct polymers are polyunsaturated cyclic, polycyclic and acyclic molecules formed by concurrent acid-catalyzed reactions including, among others, polymerization, alkylation, cyclization, and hydride transfer reactions. Conjunct polymers consist of an unsaturated intricate network of molecules that may include one or a combination of 4-, 5-, 6- and 7-membered rings and some aromatic entities in their skeletons. Some examples of the likely polymeric species were reported by Miron et al. (*Journal of Chemical and Engineering Data*, 1963) and Pines (*Chem. Tech*, 1982). These molecules contain double and conjugated bonds in intricate structures containing a combination of cyclic and acyclic skeletons.

In practice, conjunct polymers are also called "red oils" due to their color and "acid-soluble oils" due to their high uptake in the catalyst phase where saturated hydrocarbons and paraffinic products are usually immiscible.

The conjunct polymers deactivate ionic liquid catalysts because they form complexes or simply interact with the ionic liquid catalysts. It is believed that such complexes form because conjunct polymers by virtue of their double bonds will form pi complexes with the Lewis acid species in the ionic liquid catalyst. As an example, conjunct polymers complex with $AlCl_3$, a Lewis acid, present in the ionic liquid catalyst 1-butyl-pyridinium heptachloroaluminate. Complex formation weakens the acid strength of the catalyst, decreases catalyst activity, and eventually renders the catalyst ineffective for influencing reactions such as an alkylation reaction between isoparaffins and olefins. As a result, catalyst activity is a function of the concentration of conjunct polymers in the ionic liquid phase; catalyst activity decreases as the concentration of conjunct polymers increases. (However, a small amount of conjunct polymer is found to be beneficial for the regeneration reaction.) Therefore, the present regeneration process breaks up the conjunct polymers-$AlCl_3$ complexes and removes the conjunct polymers from the ionic liquid phase so that they are prevented from re-entering the catalyst phase and further interacting with the catalyst.

The regeneration process involves providing an ionic liquid catalyst, wherein at least a portion of the ionic liquid catalyst contains conjunct polymers, and reacting this ionic liquid catalyst with aluminum metal. Hydrogen may be supplied to the reaction, but it is not essential to the intended removal of conjunct polymers from the spent catalyst. This reaction frees the conjunct polymers from the ionic liquid catalyst so that they may be effectively removed from the catalyst phase. Removal of the conjunct polymers from the regenerated catalyst is extremely important because otherwise the conjunct polymers will remain in the catalyst phase and re-complex and further interact with the catalyst and accelerate its deactivation.

The reaction is conducted in a stirred reactor or a reactor with a fixed bed, e.g., of aluminum. The reaction occurs on the surface of the aluminum metal. therefore, sufficient mixing is necessary to facilitate mass transport from the liquid phase to the aluminum surface and back to the bulk liquid phase. In one embodiment, the stirred reactor is a continuous stirred tank reactor (CSTR). The fixed bed reactor offers ease of operation as one does not need an agitator. There is therefore less unit maintenance required, and catalyst can be added or replaced with ease. It also provides plug flow inside the reactor, thus reducing the necessary residence time for a given conversion. Scale-up is also easily accomplished. The regeneration can generally be carried out at a temperature of from 20 to 200° C., and in another embodiment, from 60 to 120° C.

The reaction is coupled with a removal/extraction of the conjunct polymer before it can be re-associated with the catalyst. In one embodiment of the present process, the de-bonded conjunct polymers are removed through solvent extraction. Thus, the regeneration process further includes extracting the conjunct polymers from the ionic liquid catalyst with a solvent. Solvent extraction is well known and often practiced in the art. As the conjunct polymers have the ability to go into the catalyst phase and re-react with the ionic liquid catalyst, it is important to remove the conjunct polymers from the catalyst phase as soon as possible after the reaction between the catalyst and aluminum metal. The extraction of the conjunct polymers should therefore, immediately follow the reaction freeing the conjunct polymers. Most preferably, the extraction and reaction steps occur almost simultaneously.

Hydrocarbon solvents successfully dissolve the conjunct polymers to remove them from the catalyst phase. Useful hydrocarbon solvents for the extraction include, but are not limited to, hexane, heptane, octane, pentane, decane and many other hydrocarboneous solvents. Solvents to be used can be low boiling solvents for ease of recovery and non-branched hydrocarbons to limit side reactions with the regenerated catalyst. Other examples of useful hydrocarbon solvents are n-butane, and isobutane.

It has been discovered that solvent extraction is effective to remove the freed conjunct polymers only after the ionic liquid catalyst reacts with the aluminum metal to free the conjunct polymers. Conjunct polymers are generally highly soluble in hydrocarbons. However, previous attempts to remove conjunct polymers from the catalyst phase prior to de-bonding, for example, by simple extraction methods with hydrocarbon solvents such as hexane, decane and toluene were unsuccessful. It appears that the presence (or accumulation) of conjunct polymer molecules in the catalyst phase is not simply by virtue of being miscible in the ionic liquid phase. While conjunct polymers may be miscible in the ionic liquids, their accumulation in the catalyst phase is most likely caused by being bound through strong interactions and complexation rather than being soluble in the ionic liquid phase. Thus, extraction is not effective until the conjunct polymers are "unattached" from the ionic liquid catalyst.

It has been discovered that such extraction is successfully accomplished when using a stirred stage, extraction column or a packed column on the reaction product obtained from the fixed bed or stirred reactor as discussed above. High separation efficiency is achieved, with countercurrent flow through the columns working best. The packed column is simple, and with a sufficient flow rate good enough contact is realized to permit efficient and effective solvent extraction of the conjunct polymer. The extraction packings can be commonly available packings, e.g., structural metal packings, Raschig rings or Koch-Sulzer packings. The purpose of the packing is to increase surface area for contact and increase the efficiency of mixing. The stirred extraction column offers even improved contact between the two phases, and takes less solvent. Conjunct polymer recovery rates of at least 80%, 90%, 95% or even 99% are possible when using the combination of the reactor and solvent extraction column described.

While the catalyst regeneration process can be employed to regenerate an ionic liquid catalyst that is used to catalyze any Friedel-Crafts reaction, in one embodiment the spent ionic liquid catalyst was used to catalyze an alkylation reaction between isoparaffins and olefins. As used herein, the term "isoparaffin" means any branched-chain saturated hydrocarbon compound, i.e. a branched-chain alkane with a chemical formula of $C_nH_{2n+2}$. Examples of isoparaffins are isobutane and isopentane. The term "olefin" means any unsaturated hydrocarbon compound having at least one carbon-to-carbon double bond, i.e. an alkene with a chemical formula of $C_nH_{2n}$. Examples of olefins include ethylene, propylene, butenes, and so on.

The aluminum metal can be in the form of powder (20-75 micrometer), pellets (1-3 mm) or aluminum beads (5-15 mm). Alternatively, the aluminum metal can be in the form of granules, sponges, gauzes, wire, rods . . . etc. The aluminum metal may be in (1) macroscopic form, which includes wires, foils, fine particles, sponges, gauzes, granules, etc. or (2) microscopic form, which includes powders, smokes, colloidal suspensions, and condensed metal films.

While the ionic liquid catalyst is liberated from the conjunct polymers after the reaction and extraction steps, aluminum metal may be present in the catalyst phase making it necessary to filter the aluminum metal from the catalyst phase in order to recover regenerated ionic liquid catalyst that can be recycled to the process which exploits the catalyst. It is also desirable to filter the ionic liquid catalyst-aluminum metal mixture to recover the aluminum metal for re-use in the regeneration process. Thus, a preferred embodiment of the present invention further comprises filtering the ionic liquid catalyst before the extraction step to separate aluminum metal from the ionic liquid catalyst. It is preferred to filter before the extraction step so that only one filtration is needed rather than filtering catalyst and solvent separately. Any type of filtration unit that collects particulate matter can be employed such as a cartridge filter. The ionic liquid catalyst is then conveyed to an alkylation unit for re-use in an alkylation process. It should be noted that the regenerated ionic liquid catalyst may be recycled to any process in which it is exploited to catalyze a reaction.

The additional filtering steps are important because the aluminum metal carried over from the reaction can foul process units downstream, for example, the alkylation unit.

After the reaction and extraction steps, an appreciable amount of ionic liquid catalyst may also be present in the solvent-conjunct polymer phase. If so, solvent-conjunct polymer phase is basically an emulsion of solvent, conjunct polymers, and a smaller amount of ionic liquid catalyst. In order to re-use the solvent in the regeneration process of the present invention and recover as much regenerated catalyst as possible, the remaining catalyst can be separated from the solvent-conjunct polymer phase. Such separation can be accomplished through coalescence (i.e. reverse emulsification) of the solvent-conjunct polymer-catalyst mixture.

Thereafter, the conjunct polymers and solvent can be separated by simple stripping methods using distillation. Then the solvent can be recycled to the catalyst regeneration process.

It is not necessary to regenerate the entire charge of catalyst. In some instances, only a portion or slipstream of the catalyst charge is regenerated. In those instances, only as much ionic liquid catalyst is regenerated as is necessary to maintain a desired level of catalyst activity in the process in which the ionic liquid is used as the catalyst.

Any type of ionic liquid catalyst may be regenerated according to the process of the present invention. One example of an ionic liquid catalyst is an amine-based cationic species mixed with aluminum chloride like 1-alkyl-pyridinium chloroaluminate, such as 1-butyl-pyridinium heptachloroaluminate. Preferably the ionic liquid catalyst is selected from the group consisting of:

a chloroaluminate ionic liquid catalyst comprising a hydrocarbyl substituted pyridinium halide mixed in with aluminum trichloride or a hydrocarbyl substituted imidazolium and aluminum trichloride preferably in 1 molar equivalent hydrocarbyl substituted pyridinium halide or hydrocarbyl substituted imidazolium halide to 2 molar equivalents aluminum trichloride of the general formulas A and B, respectively;

a chloroaluminate ionic liquid catalyst comprising an alkyl substituted pyridinium chloride and aluminum trichloride or an alkyl substituted imidazolium chloride and aluminum trichloride preferably in 1 molar alkyl substituted pyridinium chloride or alkyl substituted imidazolium chloride to 2 molar equivalents of aluminum trichloride of the general formulas A and B, respectively;

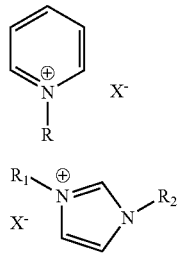

and mixtures thereof, where R=H, methyl, ethyl, propyl, butyl, pentyl or hexyl group and X is a haloaluminate and preferably a chloroaluminate, and $R_1$ and $R_2$=H, methyl, ethyl, propyl, butyl, pentyl, or hexyl group and where $R_1$ and $R_2$ may or may not be the same.

The following examples are provided to further illustrate the embodiments of the present process. They are meant only to be illustrative, and not limiting.

EXAMPLES

Example 1

Reaction Shake Test

A reaction shake test (i.e. batch reaction) was conducted where ionic liquid catalyst was contacted with aluminum metal in the presence of hydrogen to liberate conjunct polymers from the catalyst phase. 100 grams of spent ionic liquid catalyst containing 6.4 weight % conjunct polymers (i.e. 6.4 grams) was combined with 8 grams of aluminum powder in a 300 cc autoclave reactor. No solvent was added. The reactor was sealed and the conjunct polymer-containing ionic liquid catalyst and aluminum powder were reacted at 100° C. for 1.5 hours, while being agitated The resulting product was then subjected to the extraction shake test described in Example 2.

Example 2

Extraction Shake Test

The product of Example 1 was subjected to a series of five extractions. In each extraction, 18 grams of n-hexane were added and shaken to thoroughly mix the catalyst and solvent phases. Table 1 lists the weight of conjunct polymers removed from the catalyst phase in each of the five extractions and the total weight of conjunct polymers (CP) removed from the catalyst phase. After the extractions, only 1.3 grams of conjunct polymers were present in the original catalyst sample. Thus, approximately 82% of the conjunct polymers were removed from the ionic liquid catalyst.

TABLE 1

| Extraction number | Weight CP extracted (grams) |
|---|---|
| 1 | 4.1 |
| 2 | 0.67 |
| 3 | 0.16 |
| 4 | 0.06 |
| 5 | 0.03 |
| Total weight CP extracted (grams) = | 5.0 |

The average partition coefficient of conjunct polymers in ionic liquid catalyst and hydrocarbon solvent was calculated based on the extraction shake test results and found to be approximately 14.

Example 3

Extraction Column Design

A counter-current, stirred stage, extraction column was designed. In the column, the reacted ionic liquid catalyst is fed into the top of the column while a hydrocarbon solvent is fed into the bottom of the column. The post-extraction ionic liquid catalyst is withdrawn from the bottom of the column and the solvent-conjunct polymer phase is withdrawn from the top of the column. The number of theoretical stages required for extraction was calculated based upon a partition coefficient of 14 which was measured in Example 2, for three different solvent to ionic liquid (IL) catalyst feed ratios and three different extraction percentages of liberated conjunct polymers. Table 2 lists the results on the number theoretical stages.

TABLE 2

| Solvent to IL catalyst | CP recovery rate | | |
|---|---|---|---|
| feed ratios | 90% | 95% | 99% |
| 0.5 | 1.1 | 1.4 | 2.2 |
| 1 | 0.8 | 1.1 | 1.7 |
| 2 | 0.7 | 0.9 | 1.4 |

The results indicate that 1 to 1.5 theoretical stages with a reasonable solvent to ionic liquid catalyst feed ratio (~1:1) will achieve a conjunct polymer recovery rate between 90% and 95%.

Example 4

A regeneration of used ionic liquid was performed using the continuous stirred tank reactor (CSTR) mode. The reactor is a 300 mL autoclave with dip tubes to introduce gaseous and liquid reactants. The dip tubes open at about the level of the stirring impeller near the bottom of the reactor. The reactor outlet is at the top of the autoclave and is equipped with an "in-line" screen. From the reactor the effluent flows to a back pressure regulator and then into a three phase separator. This separator allows a) gas to be separated and to flow to a vent and b) hydrocarbon liquid to be separated from ionic liquid catalyst. The two separated liquid phases flow into individual tared collection bottles under nitrogen.

For the regeneration run, the reactor was charged with 80.9 grams (50 mL bulk volume) of aluminum metal rods cut to a nominal diameter and length of—~3 mm. The autoclave was then closed and purged with nitrogen gas overnight.

To start the run, used ionic liquid catalyst (containing 6.4 wt % conjunct polymer) and dry hexane were pumped into the liquid inlet at equal gravimetric rates. Initial rates were high so that the autoclave could be filled in a short time. Stirring was set at 1500 rpm. Then feed rates were reduced to a flow rate of 11 grams/hour for both materials. Pressure was set at 300 psig. Hydrogen was allowed to trickle through the gas inlet into the reactor at 3 sccm. Then, the reactor was heated to 100° C. In a short time, both hexane and ionic liquid appeared in the separator. Levels built up and a clean separation of hexane and ionic liquid was achieved.

At this point, new hexane and ionic liquid product bottles were connected to the unit and the first yield period was started. After 24 hours, and once each 24 hours after that, new product bottles were added to begin a new yield period. In total, products from five full yield periods were collected, representing a continuous run of 120 hours. The run was terminated after 120 hours of operation.

The products from each yield period were worked up as follows:

The hexane product which contains separated conjunct polymer was rotary evaporated under vacuum to recover the hexane-soluble separated conjunct polymer.

The ionic liquid product was extracted with hexane to recover separated conjunct polymer which remained in the ionic liquid.

The residual, un-extracted conjunct polymer in the ionic liquid was recovered by hydrolysis, followed by extraction with hexane. The hexane extract was rotary evaporated to recover the actual weight of conjunct polymer. Results below show that most of the conjunct polymer was removed from the ionic liquid.

TABLE 3

| Product | Wt % Conjunct Polymer in IL Catalyst |
| --- | --- |
| Feed | 6.4 |
| Yield Period 1 | 1.5 |
| Yield Period 2 | 0.4 |
| Yield Period 3 | 0.3 |
| Yield Period 4 | 0.6 |
| Yield Period 5 | 0.5 |

Example 5

Regeneration of a Used Ionic Liquid Under Continuous Process Conditions

Continuous regeneration of used ionic liquid catalyst was carried out in a microunit containing a fixed bed of aluminum under hydrogen pressure. The "Used" Ionic Liquid Catalyst used in this experiment contained 16.4 wt % conjunct polymer by hydrolysis.

Six grams of aluminum metal powder (palletized in a hydraulic press and sieved to 20/40 mesh) were charged to a ⅜" OD tubular reactor. The reactor was connected to the unit such that the aluminum metal charge was in the isothermal zone of the three-zone electrically heated furnace. A flow of dry n-heptane at 5 mL/hour was started. Next a flow of hydrogen at 300 sccm was begun. The pressure in the unit was built up to 500 psig by means of a back pressure regulator. The reactor was then heated gradually to a set point of 100° C. A flow ~90 g/hour of used ionic liquid catalyst was started (start-of-run time). At 4.5 hours run time, ionic liquid began to flow through the back pressure regulator. At 6.6 hrs run time, the IL catalyst flow rate was reduced to 19.5 g/hour. At 8.5 hours run time, the IL catalyst flow rate was lowered to 10.7 grams per hour. At 32.8 hours the IL pump was stopped overnight. The product bottle was replaced with a fresh clean bottle. In the morning, the IL pump was started again. The IL pump was stopped at 60.2 run hours and restarted in the morning. At 63.2 run hours, the product bottle containing ionic liquid catalyst and hydrocarbon was replaced with a fresh, clean bottle. The run was continued for a total of 87.3 hours run time.

During run hours 32.8 to 60.2, the average ionic liquid catalyst flow was 7.9 g/hr and the average n-heptane flow was 7.1 g/hour. The temperature was 100° C. and the pressure was 500 psig.

The collected product from the yield period of 32.8 to 60.2 hours was separated by decantation into the upper hydrocarbon phase, yellowish in color, and the heavier, more dense lower ionic liquid phase.

The ionic liquid was dark yellow brown in color. Hydrolysis showed that the recovered ionic liquid which had passed through the microunit contained 1.9 wt % conjunct polymer. Thus 88% of the conjunct polymer originally present in the used ionic liquid catalyst was removed by passing the ionic liquid continuously over aluminum metal powder in the presence of n-heptane and hydrogen gas at 100° C. and 500 psig.

Example 6

Separation of Extractable Conjunct Polymers from the Regenerated Ionic Liquid Catalyst Phase Using a Counter-Current Packed Column A counter-current, packed, extraction column is used to separate conjunct polymers from the regenerated ionic liquid catalyst phase. Such a counter-current packed column is depicted in the FIGURE of the Drawing.

The regenerated ionic liquid catalyst phase is fed into the top portion of the extraction column while a hydrocarbon solvent is fed into the bottom portion of the extraction column. The column is packed with a packing material such as Raschig rings to facilitate the extraction. Typically, solvent to ionic liquid catalyst volumetric feed ratio of 1:1 is used. The solvent to ionic liquid catalyst feed ratio is varied to achieve optimum separation, if needed. The column is operated at 150° F. and 200 psig to achieve 90-95% conjunct polymer extraction efficiency. After the extraction, the separated ionic liquid catalyst is withdrawn from the bottom of the column for recycle back to the reactor. The solvent containing recovered conjunct polymer phase is withdrawn from the top of the column for further separation of conjunct polymer from the solvent phase.

The column diameter (D) and length (L) can be easily designed for sufficient superficial velocity which will ensure optimum extraction of conjunct polymer from the regenerated catalyst containing polymer.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A process for regenerating an ionic liquid catalyst which has been deactivated by conjunct polymers comprising:
   (a) providing an ionic liquid catalyst, wherein at least a portion of the ionic liquid catalyst is bound to conjunct polymers;
   (b) reacting the ionic liquid catalyst with aluminum metal to free the conjunct polymers from the ionic liquid catalyst in a stirred reactor or a fixed bed reactor; and
   (c) separating the conjunct polymers from the ionic liquid catalyst by solvent extraction in a stirred or packed extraction column.

2. The process according to claim 1, wherein the separating step (c) immediately follows the reacting step (b).

3. The process according to claim 1, wherein the solvent is a hydrocarbon.

4. The process according to claim 3, wherein the solvent is selected from the group consisting of pentane, hexane, heptane, octane, decane, n-butane, isobutane, isopentane, and mixtures thereof.

5. The process according to claim 1, further comprising filtering the ionic liquid catalyst after the extracting step to separate aluminum metal from the ionic liquid catalyst.

6. The process according to claim 1, wherein the ionic liquid catalyst has been used to catalyze a Friedel-Crafts reaction.

7. The process according to claim 6, wherein the Friedel-Crafts reaction is alkylation.

8. The process according to claim 1, wherein the reaction in step (b) is conducted in a batch or continuous stirred reactor.

9. A process according to claim 1, wherein the ionic liquid catalyst is selected from the group consisting of:
   a chloroaluminate ionic liquid catalyst comprising a pyridinium haloaluminate and aluminum trichloride or an imidazolium haloaluminate and aluminum trichloride of the general formulas A and B below, respectively;
   a chloroaluminate ionic liquid catalyst comprising a hydrocarbyl substituted pyridinium haloaluminate and aluminum trichloride or a hydrocarbyl substituted imidazolium haloaluminate and aluminum trichloride of the general formulas A and B below, respectively;
   a chloroaluminate ionic liquid catalyst comprising an alkyl substituted pyridinium haloaluminate and aluminum trichloride or an alkyl substituted imidazolium haloaluminate and aluminum trichloride of the general formulas A and B below, respectively; and mixtures thereof, wherein A and B are as follows:

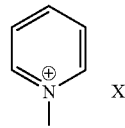

(A)

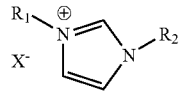

(B)

wherein R=H, hydrocarbyl, or alkyl, X is a haloaluminate, $R_1$ and $R_2$=H, hydrocarbyl, or alkyl, and $R_1$ and $R_2$ may or may not be the same.

10. A process according to claim 9, wherein R=H, methyl, ethyl, propyl, butyl, pentyl or hexyl group, $R_1$ and $R_2$=H, methyl, ethyl, propyl, butyl, pentyl, or hexyl group, and $R_1$ and $R_2$ may or may not be the same.

11. A process according to claim 9, wherein 1 molar equivalent of the hydrocarbyl substituted pyridinium haloaluminate or the hydrocarbyl substituted imidazolium haloaluminate is mixed with 2 molar equivalents of aluminum trichloride.

12. A process according to claim 9, wherein 1 molar equivalent of the alkyl substituted pyridinium haloaluminate or the alkyl substituted imidazolium haloaluminate is mixed with 2 molar equivalents of aluminum trichloride.

13. The process according to claim 1, wherein the stirred extraction column is a stirred stage extraction column.

14. The process according to claim 1, wherein the packed extraction column or the stirred extraction column uses a countercurrent flow with the ionic liquid catalyst fed into one end of the column and a solvent fed into a second end of the column.

15. The process according to claim 13, wherein the packed extraction column or the stirred extraction column uses a countercurrent flow with the ionic liquid catalyst fed into one end of the column and a solvent fed into a second end of the column.

16. The process of claim 1, wherein the separating step recovers at least 80 wt % of the conjunct polymers.

17. The process of claim 15, wherein the separating step recovers at least 80 wt % of the conjunct polymers.

18. The process of claim 16, wherein the separating step recovers at least 90 wt % of the conjunct polymers.

19. The process of claim 13, wherein the number of stages used to separate the conjunct polymers in the stirred stage extraction column is 2 or less.

20. The process of claim 14, wherein the one end is a top of the column and the second end is a bottom of the column.

* * * * *